US011792473B2

(12) United States Patent
Candelore et al.

(10) Patent No.: US 11,792,473 B2
(45) Date of Patent: Oct. 17, 2023

(54) STREAM REPAIR MEMORY MANAGEMENT

(71) Applicant: Sony Group Corporation, Tokyo (JP)

(72) Inventors: Brant Candelore, Poway, CA (US);
Adam Goldberg, Fairfax, VA (US);
Fred Ansfield, San Diego, CA (US);
Graham Clift, Poway, CA (US); Loren F. Pineda, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/506,592

(22) Filed: Oct. 20, 2021

(65) Prior Publication Data

US 2023/0038971 A1    Feb. 9, 2023

Related U.S. Application Data

(60) Provisional application No. 63/260,022, filed on Aug. 6, 2021.

(51) Int. Cl.
*H04N 21/44*    (2011.01)
*H04N 21/433*    (2011.01)
*H04N 7/035*    (2006.01)

(52) U.S. Cl.
CPC ..... *H04N 21/44004* (2013.01); *H04N 7/0357* (2013.01); *H04N 21/433* (2013.01)

(58) Field of Classification Search
CPC ......... H04N 21/44004; H04N 21/0357; H04N 21/433
See application file for complete search history.

(56) References Cited

U.S. PATENT DOCUMENTS

| 6,530,055 | B1 | 3/2003 | Fukunaga |
| 7,979,844 | B2 | 7/2011 | Srinivasan |
| 11,303,954 | B1* | 4/2022 | Candelore .......... H04N 21/6131 |
| 2005/0206648 | A1 | 9/2005 | Perry |
| 2007/0046679 | A1* | 3/2007 | Tanaka ..................... G06T 1/00 |
|  |  |  | 345/501 |
| 2008/0028276 | A1* | 1/2008 | Li .......................... H04L 65/80 |
|  |  |  | 714/752 |
| 2010/0128595 | A1* | 5/2010 | Karaoguz ........ H04N 21/44209 |
|  |  |  | 370/216 |
| 2017/0289616 | A1* | 10/2017 | Igarashi ............. H04N 21/2187 |
| 2021/0185388 | A1 | 6/2021 | Clift |

OTHER PUBLICATIONS

Bica, Ion & Ghita, Stefan-Vladimir & Togan, Mihai. (2010). An IP multicast—HTTP Gateway for reliable streaming in heterogeneous networks. 10.1109/ICCOMM.2010.5509058.

(Continued)

*Primary Examiner* — Yassin Alata
(74) *Attorney, Agent, or Firm* — John L. Rogitz; John M. Rogitz (57) ABSTRACT

Techniques are described for expanding and/or improving the Advanced Television Systems Committee (ATSC) 3.0 television protocol in robustly delivering the next generation broadcast television services. Multiple memory buffers are used to manage broadcast packet repair and presentation or storage.

20 Claims, 6 Drawing Sheets

Buffer 2 Logic (56) References Cited

OTHER PUBLICATIONS

Rejaie, Reza & Kangasharju, Jussi. (2001). Mocha: A Quality Adaptive Multimedia Proxy Cache for Internet Streaming. Proceedings of the IEEE International Workshop on Network and Operating System Support for Digital Audio and Video. 10.1145/378344. 378345.

Vinaymurthi K K et Al: "FPGA based implementation of low latency multichannel satellite modulator with packet loss detection", 2017 4th IEEE International Conference On Engineering Technologies and Applied Sciences (ICETAS). IEEE, Nov. 29, 2017 (Nov. 29, 2017), pp. 1-5, XP033311580, DOI: 10.1109/ICETAS.2017. 8277864 [retrieved on Jan. 31, 2018] the whole document.

* cited by examiner

FIG. 7  Buffer 1 Logic

FIG. 8  Buffer 2 Logic

FIG. 9  Buffer 3 Logic

STREAM REPAIR MEMORY MANAGEMENT

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high-definition televisions to wireless telephones. ATSC 3.0 also orchestrates coordination between broadcast content (referred to as "over the air" or OTA) and related broadband delivered content and services (referred to as "over the top" or OTT). ATSC 3.0 is designed to be flexible so that as technology evolves, advances can be readily incorporated without requiring a complete overhaul of any related technical standard.

As understood herein, an ATSC 3.0 receiver scans for services in a single frequency network (SFN) or a multifrequency network (MFN). In addition, the ATSC 3.0 receiver may be receiving services over broadband when both those types of frequency networks are not available. The receiver may be attempting to render content real-time to a display or recording the content to a storage device.

SUMMARY

As further understood herein, when broadcast content is received it is processed and corrected for errors. The ATSC broadcast streams have built-in forward error correction (FEC) in the modulation scheme employed which will fix many single bit errors in ATSC Link Layer Packets (ALP). Multi-bit or missing packets are severe errors that may occur on boundary conditions where the signal path is degraded or there is loss of signal lock. These types of errors cannot be repaired with FEC. As recognized herein, there is desire to improve such content by replacing the missing or uncorrectable packets prior to rendering or writing to storage. This process requires examining the content for the errors, and then deciding if an extensive repair process or possibly re-selecting what is the primary broadcast feed is, e.g., if there is a second frequency in a MFN, should be initiated. Even if a comparable service exists on a second frequency, it may be determined that access is transitory and that the primary broadcast feed should not change. However, if a repair is to be attempted, it typically involves replacing not just the packets that are missing or in error, but all the packets associated within that Group of Frames that those packets find themselves in. These might be retrieved from packets obtained from the service on a second frequency or, if not available, through broadband. The repair application requires unfettered access to content memory. However, the concurrent writing to content memory by different software applications or hardware circuit running on the same device and trying to access the same memory can pose problems. More specifically, when one software application or hardware circuit is accessing the memory, it can lock-up the memory for the other applications or hardware circuits. This means that there can be contention between applications or hardware circuits, such as when an application involved with the repair needs to replace missing or damaged content segments while a receiving application or circuit needs to store incoming content segments, and a rendering or storing application or circuit needs to access that memory for either decompression and playback purposes, or longer-term storage, e.g. hard disk drive or solid-state drive, thereby competing for access to the same memory.

Accordingly, in digital television in which at least one receiver can receive broadcast signals, a method includes receiving broadcast digital television (DTV) data elements in a buffer. The method includes, responsive to the buffer containing a data amount satisfying a threshold, identifying whether any replacement content for packet errors in DTV data elements in the buffer are available, and responsive to replacement content being available, repairing at least a first DTV data element in the buffer. The method also includes communicating DTV data elements in the buffer to at least one decompression or storage engine to process the DTV data elements for presentation thereof on at least one display or for storage to a recording medium.

In some embodiments the method can include signaling to the decompression or storage engine that at least a second DTV data element contains at least one error responsive to replacement content for the second DTV data element not being available.

In example implementations the DTV data elements can include DTV packets.

In example embodiments, the buffer is a first buffer with a first range of memory addresses, and the method includes, while the DTV data elements are being received into the first buffer before the first buffer is full, repairing errors in DTV data elements in a second buffer having a second range of memory addresses. In some implementations, while the DTV data elements are being received into the first buffer before the first buffer is full and errors are being repaired in the second buffer, the method includes communicating DTV data elements from a third buffer to the decompression or storage engine. The third buffer has a third range of memory addresses. When the third buffer is empty, its memory pointers get changed to the ones that were for the second buffer. Then, DTV data elements that were from the second buffer, and now in the third buffer, can be communicated to the decompression or storage engine which assumed the upon completion of repairing errors in DTV data elements that were in the second buffer.

The memory addresses of the buffers are all different from each other and if desired do not overlap each other. If desired, the pointers to the various buffers can change. When the first buffer contains an amount of data satisfying a threshold, such as when the buffer is full, it becomes the second buffer. The repair application may be given the memory location point of what used to be the first buffer. The buffer can be given a termination address or a buffer size. The older second buffer's pointer is now given to the application involved with rendering—where the second buffer now becomes the third buffer. The old third buffer with old content can now become an available buffer to become the first buffer to receive incoming packets.

In another aspect, a digital television (DTV) apparatus includes at least one digital television (DTV) receiver and at least one processor programmed with instructions to configure the processor to control at least first, second, and third buffers to simultaneously respectively receive broadcast digital television (DTV) data elements, repair DTV data elements, and communicate DTV data elements to a processing engine for presentation, on at least one display, or storage to a recording medium of content represented in the DTV data elements.

In another aspect, an apparatus includes at least one processor configured to cycle received broadcast digital television (DTV) between at least three buffer operations that include reception, error correction, and data read out. Each buffer operation is executed sequentially in each of at least first, second, and third buffers having respective memory register allocations. The processor is configured to prevent contention for buffer use among applications performing the buffer operations.

The details of the present application, both as to its structure and operation, can best be understood in reference to the accompanying drawings, in which like reference numerals refer to like parts, and in which:

DETAILED DESCRIPTION

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 publication A/344, incorporated herein by reference, may be particularly relevant to techniques described herein.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable universal serial bus (USB) thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

A recitation of "having at least one of A, B, and C" (likewise "having at least one of A, B, or C" and "having at least one of A, B, C") includes A alone, B alone, C alone, A and B together, A and C together, B and C together, and/or A, B, and C together, etc.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 1:
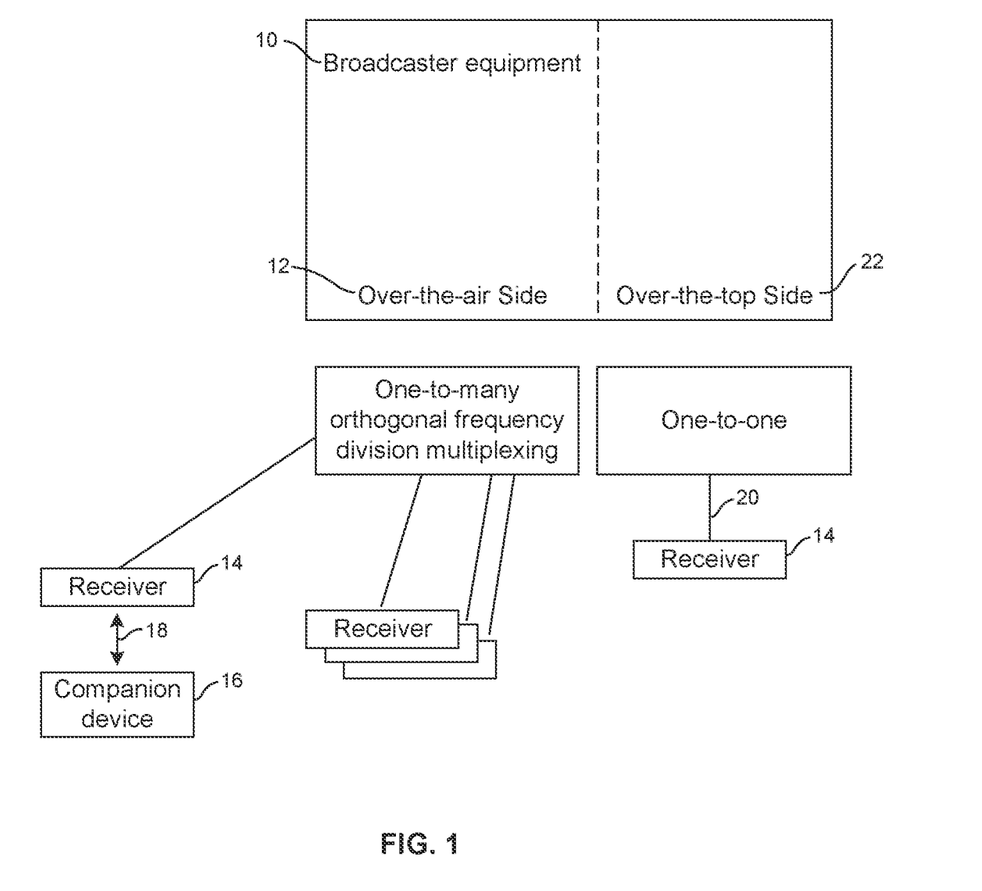
FIG. 1 illustrates an Advanced Television Systems Committee (ATSC) 3.0 system.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, headphones, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
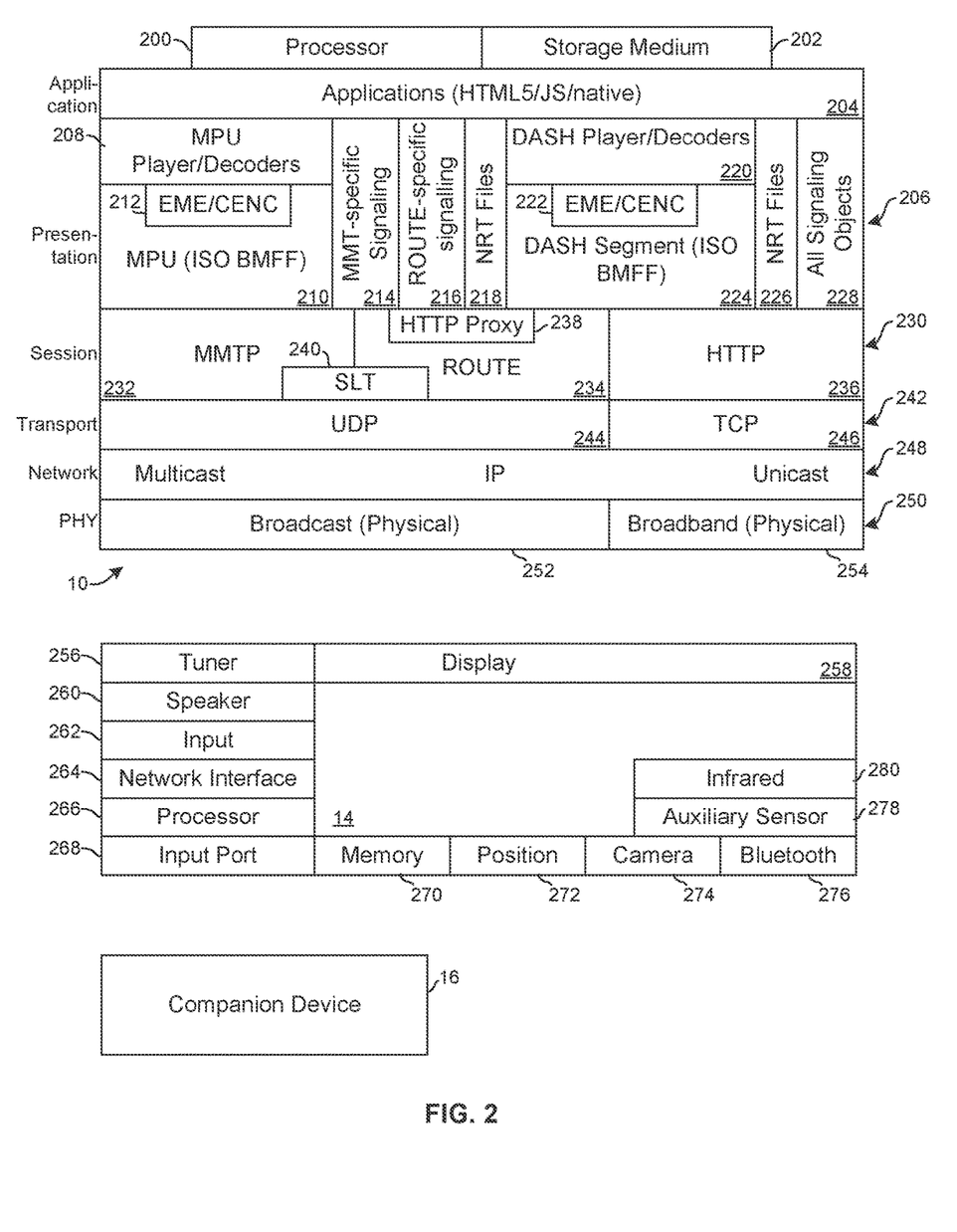
FIG. 2 illustrates components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC-4) format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/ common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/ BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MMT for transport, though it is not shown here.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device such as Virtual Reality (VR) goggles or smart glasses, and so on. Regardless, it is to be understood that the receiver 14 and/or other computers described herein is configured to undertake present principles (e.g., communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high-definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g., receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g., all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
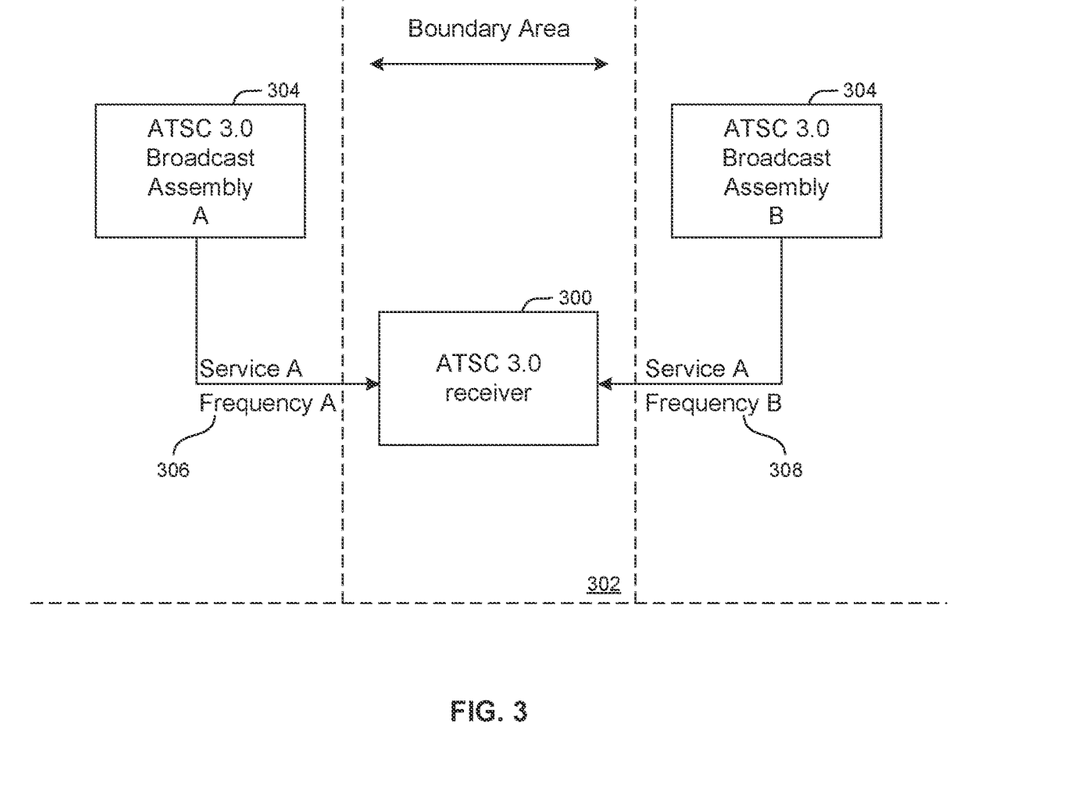
FIG. 3 illustrates an example specific system.

Now referring to FIG. 3, a simplified digital TV system such as an ATSC 3.0 system is shown. In FIG. 3, a mobile or stationary digital TV receiver such as an ATSC 3.0 receiver 300 that may include any or all of the relevant components discussed above in relation to FIGS. 1 and 2 is located in a boundary region 302 between first and second ATSC 3.0 broadcast stations or assemblies 304, with signals from both broadcast stations 304 being picked up by the receiver 300 in the region 302. A first ATSC 3.0 service ("Service A") is broadcast from the first broadcast station 304 over a first frequency 306, whereas the same service A is broadcast from the second broadcast station 304 over a second frequency 308 different from the first frequency 306. The receiver 300 picks up both frequencies, i.e., the receiver 300 picks up signals from both broadcast stations 304.

Figure 4:
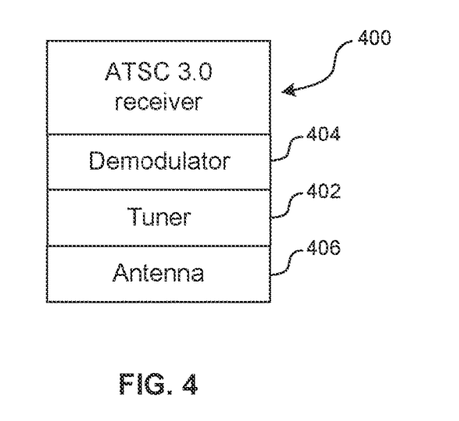
FIG. 4 illustrates a first example embodiment of a digital TV receiver.

FIG. 4 illustrates an example non-limiting embodiment of a digital TV receiver such as an ATSC 3.0 receiver 400 that may include any or all of the relevant components discussed above in relation to FIGS. 1 and 2. In the example shown, the ATSC 3.0 receiver 400 may be a stationary receiver, e.g., a receiver located inside a home. In some examples, the ATSC 3.0 receiver 400 may be a mobile receiver, e.g., as by being implemented in a mobile phone or being disposed in a moving vehicle.

The example ATSC 3.0 receiver 400 shown in FIG. 4 includes a tuner 402 sending signals to a demodulator 404 that the tuner picks up from one or more antennae 406. In the example shown, the receiver 400 includes one and only one tuner, one and only one demodulator, and one and only one antenna.

Figure 5:
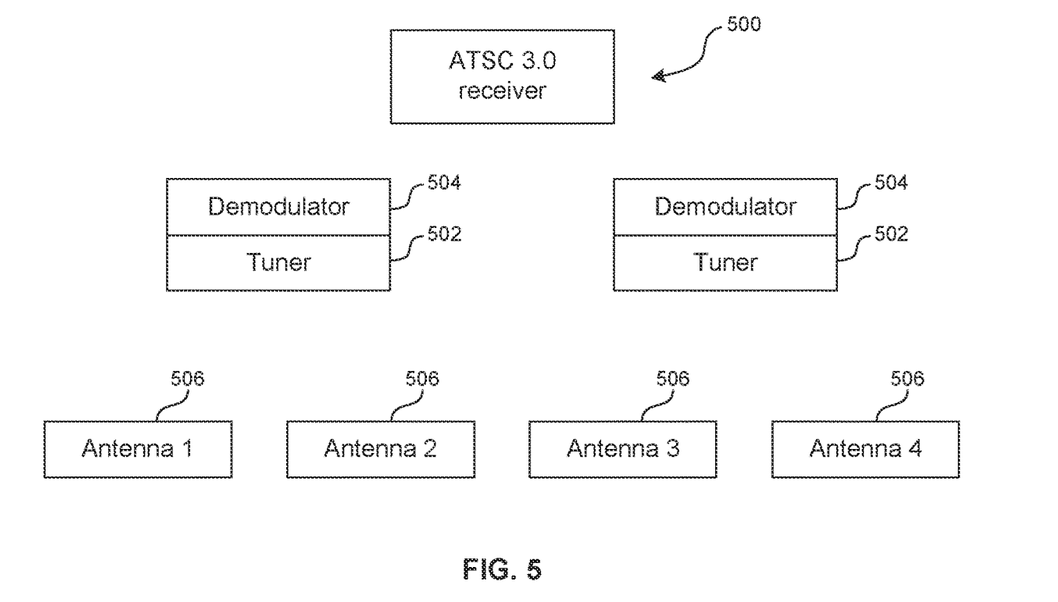
FIG. 5 illustrates a second example embodiment of a digital TV receiver.

In contrast, FIG. 5 illustrates an example non-limiting embodiment of a digital TV receiver such as an ATSC 3.0 receiver 500 that may include any or all of the relevant components discussed above in relation to FIGS. 1 and 2. In the example shown, the ATSC 3.0 receiver 500 may be a mobile receiver, e.g., as by being implemented in a mobile phone or being disposed in a moving vehicle. In some examples, the ATSC 3.0 receiver 500 may be a stationary receiver, e.g., a receiver located inside a home.

The example ATSC 3.0 receiver 500 shown in FIG. 5 includes plural tuners 502 sending signals to respective demodulators 504 picked up by the tuners from one or more antennae 506. In the non-limiting example shown, the ATSC 3.0 receiver 500 has two tuners and two demodulators, it being understood that the receiver may have a greater or lesser number of tuner/demodulators. In the non-limiting example shown, the ATSC 3.0 receiver 500 has four antennae, it being understood that the receiver may have a greater or lesser number of antennae. The receiver 500 may have the capability to switch antennae input to the tuners, such that a first tuner may receive signals from, e.g., three antennae and a second tuner may receive signals from the fourth antenna, and then a switch may be made to swap antenna input between the tuners. Two antennae may provide input to each respective tuner. All four antennae may provide input to a single tuner. These and other antenna-tuner configurations can be changed on the fly during operation as needed. It should be noted that while reception of OTA signals using different configuration of terrestrial antennae is contemplated, the receiver 500 may still retain a broadband connection 250 to a telephony, WI-FI or satellite data service.

Any of the devices, systems, and configurations above may be used to implement the techniques herein.

As set forth in greater detail below, techniques described herein to repair content make use of multiple buffers that are sequenced and partitioned into segregated blocks of memory. In all the various ATSC 3.0 transmission scenarios, content and related metadata are sent using ATSC Link Layer Protocol (ALP) packets. For example, Buffer 1 receives incoming and UDP/IP content using the ALP packets. This is a layer above the Physical Layer Pipes (PLPs). There is often a low-level demodulator to memory connection allowing the content to be received into Buffer 1 without much processor 200 involvement apart from set-up. Buffer 1 can be monitored to determine how much data it contains to determine when the amount of data satisfies a threshold, such as 80% of full or 100% full or other threshold. Packets with errors may be flagged in memory by setting an Error Indicator Bit associated with each ALP packet. The demodulator typically can set the value of this bit as it is received when the packets fail a Cyclic Redundancy Check (CRC). Missing packets can be flagged as null packets. When full or otherwise containing an amount of data satisfying a threshold, the Buffer 1 can be re-initialized by the processor 200 with new memory pointers to free, e.g., recycled memory. In the repair scenarios herein, the memory for Buffer 1 is now Buffer 2. Typically, Buffer 2 can be linked to the decompression engine. But in this case, a repair process requires the processor to look at each packet in Buffer 2 to see if there is an Error Indicator Bit set which indicates that the FEC was not able to correct one or more errors and the resulting data received failed a hardware checksum operation. The processor may determine whether a repair operation makes sense. If it is only one packet, then simple error concealment in the decompression might suffice. If multiple packets are in error or missing, then the processor can take action. Since the same content is not treated exactly the same in broadcast systems because of possible differences in transcoding in order to save bandwidth by the different transmission systems, the safest is for the processor to replace packets for the group of pictures starting with the Start of Frame (SOF) of an Intracoded-Frame (I-Frame) previous to the missing packets or packets with errors and all packets containing the B-Frames and P-Frames. Audio is not as heavily compressed. All the audio packets received with the affected video packets can be replaced as needed.

The data is processed by the repair application, which looks at the content segments to locate missing or damaged content segments and tries to replace them either from an adjoining service transmission (which might be tuned in parallel) or over the Internet (communicating back to the Broadcaster broadband OTT service 22), and Buffer 3 is the buffer with the content in the best state of repair ready to be sent to ae decompression or storage engine. When Buffer 3 is spent its pointers are zeroed and it becomes Buffer 1 to accept new content. The memory is therefore segmented, and certain applications are locked out of adjoining memory that is not in their tasking. It is possible that there are actually four buffers. When Buffer 3 is spent, it becomes a temporary buffer, Buffer 4, that can become Buffer 1 (when buffer 1 incoming writes have terminated).

Present techniques repair errors from noise and missing packets, if possible, from content available from another antenna/demodulator in the same receiver or from the Internet, e.g., broadcaster or aggregator web content 22. This must be done while content is continually streaming into the receiver and being rendered on the display or stored to memory 270. Buffers should be large enough to accommodate time needed for processing a repair buffer to determine missing content and requesting and receiving repair data from a remote server or extracting the content from a separate memory connected to the second tuner/demodulator. This is typically less expensive than retrieving repair data from a cellular or satellite network.

Figure 6:
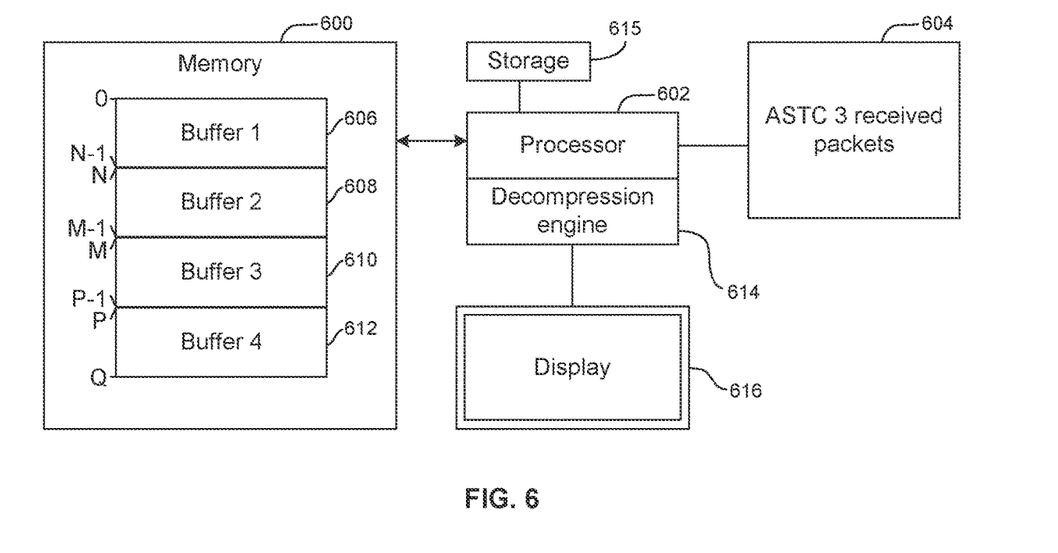
FIG. 6 illustrates an example specific receiver memory system.

FIG. 6 illustrates one or more memories 600 can accessed by one or more processors 602 in a digital TV receiver such as any of the receivers discussed herein, e.g., the multi-tuner/demodulator receiver 500 in FIG. 5, to receive and process broadcast digital TV (such as ASC 3.0) content packets 604. The memory 600 includes, in one example, at least three and in the example shown four buffers 1-4 (labeled 606, 608, 610, and 612 in FIG. 6). Each buffer is assigned permanent memory registers, respectively registers 0 to N−1 for the first buffer 606, registers N to M−1 for the second buffer 608, registers M to P−1 for the third buffer 610, and registers P to Q for the fourth buffer 612. Applications executed by the processor 602 to operate on respective functions of the respective buffers are not allowed to access memory addresses of other buffers at the same time.

Figure 7:
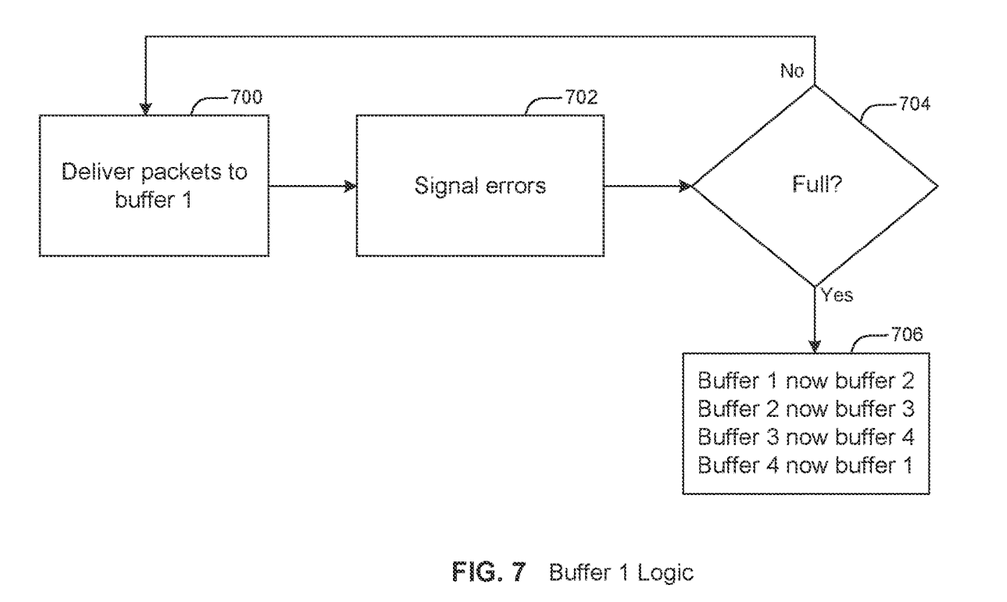
FIG. 7 illustrates example logic in example flow chart format for the first buffer.
Figure 8:
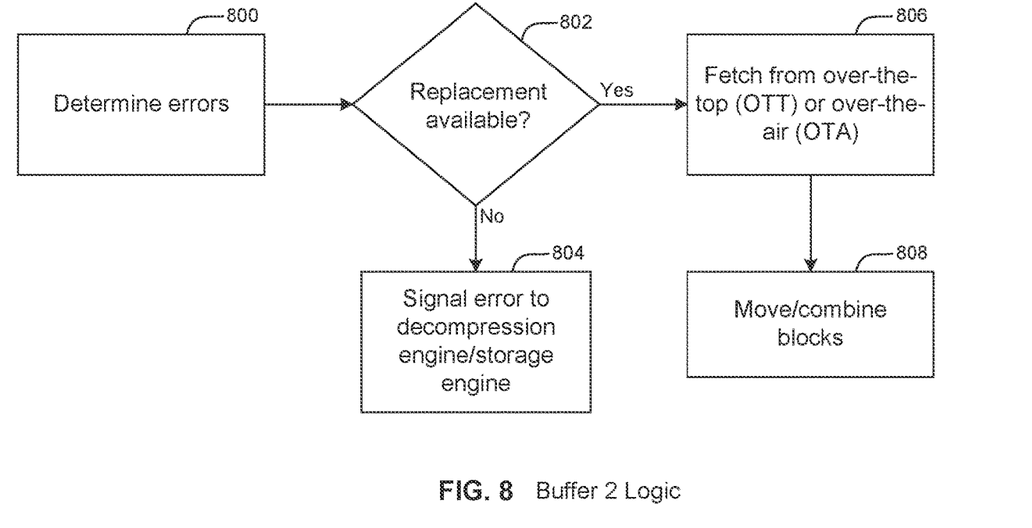
FIG. 8 illustrates example logic in example flow chart format for the second buffer.
Figure 9:
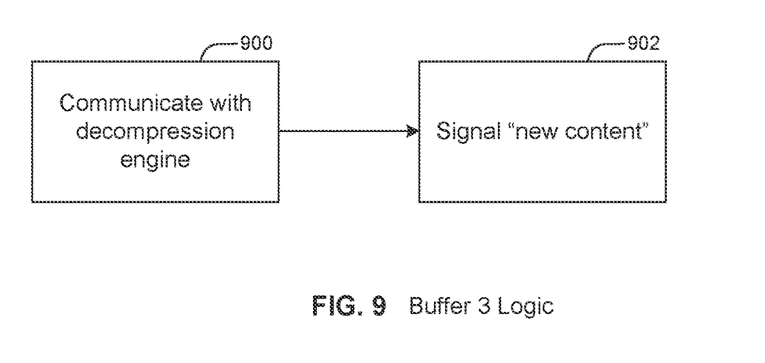
FIG. 9 illustrates example logic in example flow chart format for the third buffer.

Thus, the processor simultaneously executes a first application to undertake packet reception logic in the first buffer 606 as described in FIG. 7, a second application to undertake packet repair logic in the second buffer 608 as described in FIG. 8, and a third application to undertake packet read-out logic in the third buffer 610 as described in FIG. 9, with the applications not being allowed access to other buffers until the other buffers cycle to the appropriate function as set forth further below.

The data read out from the third buffer may be sent to a decompression engine 614 or other appropriate processing component such as a storage engine 615 for eventual display of the content on a display 616 such as any display herein.

Accordingly, the first application can be allocated the memory registers of the first buffer when the first buffer receives packets and can be locked out of the memory registers of the second and third buffers during this time. The second and third applications are respectively assigned the memory registers of the second and third buffers during this time. Then, when the first buffer is full or contains sufficient data to satisfy a threshold (such as a high percentage of being full, e.g., 90% full) and assumes the role of the second buffer, the first application may be locked out of the memory registers of the first buffer and may be assigned the memory registers of the new buffer (e.g., the third buffer or the fourth buffer when provided) to receive incoming packets. Pursuant to this shift, the second application (error correction) is assigned the memory registers of the first buffer and is locked out of the other buffers, while the third application (data read out to the decompressor) is assigned the memory registers of the now-corrected second buffer and is locked out of the other buffers. This shifting of memory register assignation to the applications continues as the content streams in and each buffer shift occurs, to prevent contention between applications.

Commencing at block 700 in FIG. 7, packets of broadcast data (or de-packetized content data received via broadcast) is delivered to the first buffer. The first buffer can detect and signal whether any errors are detected, such as corrupted or missing data, at block 702. Decision diamond 704 indicates that this process continues until the buffer has sufficient data to satisfy a threshold, such as by being full, at which point the logic moves to block 706 in which the first buffer assumes the error correction function of a second buffer, the second buffer cycles from error correction to the read-out function of the third buffer, and the third buffer cycles from a read-out function to the reception function of the first buffer. In some cases, a fourth, "spare" buffer may be provided to assume the reception function of the first buffer prior to the third buffer completing its data readout.

Thus, in FIG. 7 filtering may be done on IP addresses, with the receiver hardware being configured to directly deliver ATSC 3.0 IP packets to a specific memory range comprising the first buffer 606. The hardware signals errors on any packets received in memory. The buffer may be an interrupt driven buffer or poll driven buffer. When the first buffer 606 is full or otherwise contains enough data to satisfy a threshold, it is marked as (assumes the role of) the second buffer 608, the second buffer 608 is marked as (assumes the role of) the third buffer 610, and the third buffer is marked as (assumes the role of) the first buffer or the fourth buffer 612 (when provided).

FIG. 8 illustrates the error correction logic of the second application operating on a buffer that has filled and is ready for error correction. Block 800 indicates identifying whether the hardware signaled any errors as the buffer was filling with data. If no errors were signaled, the logic ends. Assuming errors were signaled however, the logic moves to decision diamond 802 to determine, for any signaled error, whether replacement content is available. If replacement content is not available, at block 804 the content is not modified, and the decompression engine may be signaled to this effect to allow the decompression engine to attempt to smooth over or conceal any errors in the content. Data may also or alternatively be sent to a storage engine such as the storage engine 615 in FIG. 6 along this path of logic.

On the other hand, if replacement content is available, the logic flows to block 806 to fetch the replacement content from, e.g., another broadcast frequency being received OTA and that carries the same service as being processed or from the broadcaster over broadband, as may happen, for instance, in the boundary region 302 in FIG. 3. Recall that such a duplicate stream may be received over a second tuner/demodulator pair such as shown in FIG. 5. Or, the replacement content may be obtained OTT from a network server of the broadcaster or an aggregator. The replacement content is inserted into the data at the appropriate location of the damaged data, which is removed.

In replacing content, it can be identified what the specific errors were, what data is missing, whether, as often is the case, an entire Group of Pictures that the damaged or missing packets are found in, requires replacement. The process requires locating the Group of Pictures in the received second stream or in the Broadcaster content cache. It may require locating the particular IP packet where the Start of Frame is located and start from there, and so on.

At block 808, blocks of content may be moved around and added to with fetched content to create continuous memory needed for the decompression logic of FIG. 9 executed by the third of the above-mentioned applications.

Indeed, FIG. 9 illustrates that the third application at block 900 communicates with the decompression engine 614 in FIG. 6 to supply the decompression engine hardware the memory register identifications of the buffer that has just completed error correction from the logic of FIG. 8. Block 902 indicates that the application signals to the decompression or storage engine that new content is available for read-out for decompression and display, or storage, and the decompression engine decompresses the data from the buffer and provides it to the display 616 in FIG. 6. This is typically a "fire and forget" operation. The same goes for the operation that writes the content to memory 270.

It will be appreciated that whilst present principals have been described with reference to some example embodiments, these are not intended to be limiting, and that various alternative arrangements may be used to implement the subject matter claimed herein.

What is claimed is:

1. In digital television in which at least one receiver can receive broadcast signals, a method, comprising:
    receiving broadcast digital television (DTV) data elements in a first buffer under control of a first application, at least a second application being locked out of the first buffer while the first application executes to receive data elements;
    responsive to the first buffer containing a data amount satisfying a threshold,
    repairing at least a first DTV data element in the buffer using the second application, locking out the first application from the first buffer while the second application executes to repair the first DTV data element; and
    communicating DTV data elements in the first buffer to at least one decompression or storage engine to process the DTV data elements for presentation or storage.

2. The method of claim 1, comprising signaling to the decompression or storage engine that at least a second DTV data element contains at least one error responsive to replacement content for the second DTV data element not being available.

3. The method of claim 1, wherein the DTV data elements comprise DTV packets.

4. The method of claim 1, wherein the first buffer comprises a first range of memory addresses, and the method comprises, while the DTV data elements are being received into the first buffer before the first buffer is full, repairing errors in DTV data elements in a second buffer comprising a second range of memory addresses.

5. The method of claim 4, wherein the method comprises, while the DTV data elements are being received into the first buffer before the first buffer is full and errors are being repaired in the second buffer, communicating DTV data elements from a third buffer to the decompression or storage engine, the third buffer comprising a third range of memory addresses.

6. The method of claim 5, comprising communicating DTV data elements from the second buffer to the decompression or storage engine upon completion of repairing errors in DTV data elements in the second buffer.

7. The method of claim 6, comprising receiving DTV data elements into the third buffer upon completion of communicating DTV data elements from the third buffer.

8. The method of claim 1, wherein the DTV receiver comprises an advanced television systems committee (ATSC) 3.0 receiver.

9. A digital television (DTV) apparatus comprising:
    at least one digital television (DTV) receiver; and
    at least one processor associated with the DTV receiver and programmed with instructions to configure the processor to:
    control at least first, second, and third buffers to simultaneously respectively receive broadcast digital television (DTV) data elements, repair DTV data elements, and communicate DTV data elements to a processing engine for presentation on at least one display, of content represented in the DTV data elements, and/or storage of content represented in the DTV data elements.

10. The DTV apparatus of claim 9, wherein the instructions are executable to:
    receive DTV data elements in the first buffer;
    responsive to the first buffer containing an amount of data satisfying a threshold, identify whether any replacement content for packet errors in DTV data elements in the first buffer are available;
    responsive to replacement content being available, repair at least a first DTV data element in the first buffer; and
    communicate DTV data elements in the first buffer to the processing engine.

11. The DTV apparatus of claim 10, wherein the instructions are executable to:
    signal to the processing engine that at least a second DTV data element contains at least one error responsive to replacement content for the second DTV data element is not available.

12. The DTV apparatus of claim 9, wherein the DTV data elements comprise DTV packets.

13. The DTV apparatus of claim 9, wherein the first buffer comprises a first range of memory addresses and the instructions are executable to:
    while the DTV data elements are being received into the first buffer before the first buffer is full, repair errors in DTV data elements in the second buffer, the second buffer comprising a second range of memory addresses.

14. The DTV apparatus of claim 13, wherein the instructions are executable to, while the DTV data elements are being received into the first buffer before the first buffer is full and errors are being repaired in the second buffer, communicate DTV data elements from the third buffer to the processing engine, the third buffer comprising a third range of memory addresses.

15. The DTV apparatus of claim 14, wherein the instructions are executable to communicate DTV data elements from the second buffer to the processing engine upon completion of repairing errors in DTV data elements in the second buffer.

16. The DTV apparatus of claim 15, wherein the instructions are executable to receive DTV data elements into the third buffer upon completion of communicating DTV data elements from the third buffer.

17. The DTV apparatus of claim 9, wherein the DTV receiver comprises an advanced television systems committee (ATSC) 3.0 receiver.

18. An apparatus comprising:
    at least one processor configured to:
    cycle received broadcast digital television (DTV) between at least three buffer operations comprising reception, error correction, and data read out, each buffer operation being executed sequentially in each of at least first, second, and third buffers having respective memory register allocations; and prevent contention for buffer use among applications performing the buffer operations.

19. The apparatus of claim 18, wherein the apparatus comprises an advanced television systems committee (ATSC) 3.0 receiver.

20. The apparatus of claim 18, wherein the processor is configured to control the first, second, and third buffers to simultaneously respectively receive broadcast digital television (DTV) data elements, repair DTV data elements, and communicate DTV data elements to a processing engine for presentation or storage of content.

\* \* \* \* \*